United States Patent
Hickey et al.

(10) Patent No.: US 12,087,927 B2
(45) Date of Patent: Sep. 10, 2024

(54) IMMERSION BARRIER FOR POUCH BATTERY CELL THERMAL RUNAWAY MITIGATION

(71) Applicant: GM GLOBAL TECHNOLOGY OPERATIONS LLC, Detroit, MI (US)

(72) Inventors: Ryan P. Hickey, Royal Oak, MI (US); Matthew Swift, Detroit, MI (US); Goro Tamai, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 323 days.

(21) Appl. No.: 17/697,719

(22) Filed: Mar. 17, 2022

(65) Prior Publication Data

US 2023/0299379 A1    Sep. 21, 2023

(51) Int. Cl.
*H01M 10/647* (2014.01)
*H01M 10/625* (2014.01)
*H01M 10/6566* (2014.01)
*H01M 10/6567* (2014.01)

(52) U.S. Cl.
CPC ....... *H01M 10/647* (2015.04); *H01M 10/625* (2015.04); *H01M 10/6566* (2015.04); *H01M 10/6567* (2015.04); *H01M 2250/20* (2013.01)

(58) Field of Classification Search
None
See application file for complete search history.

(56) References Cited

U.S. PATENT DOCUMENTS

| | | | |
|---|---|---|---|
| 10,717,366 B1* | 7/2020 | Jaksic | H02M 7/5387 |
| 2013/0112331 A1* | 5/2013 | Johnson | C08K 5/548 |
| | | | 152/525 |
| 2022/0212804 A1* | 7/2022 | Sarpotdar | B60L 58/26 |
| 2023/0032529 A1* | 2/2023 | Evans | H01M 10/625 |

FOREIGN PATENT DOCUMENTS

| | | |
|---|---|---|
| DE | 102019129473 A1 | 5/2021 |
| DE | 11200000386 T5 | 9/2021 |

\* cited by examiner

*Primary Examiner* — Lisa S Park
(74) *Attorney, Agent, or Firm* — Quinn IP Law

(57) ABSTRACT

A battery module includes a first pouch battery cell and a neighboring second pouch battery cell. The battery module also includes a dielectric fluid in direct contact with and in circulation over and around each of the first and second pouch cells. The battery module additionally includes an immersion barrier positioned between the first and second pouch cells and defining an opening for controlling passage of the dielectric fluid between the first and the second pouch cells. The barrier thereby facilitates localization of a thermal runaway event in the first pouch cell by minimizing transfer of high temperature gases between the first and the second pouch cells via the dielectric fluid and controls propagation of the thermal runaway event in the module. The battery module further includes an enclosure housing and retaining each of the first and second pouch cells, the dielectric fluid, and the immersion barrier.

17 Claims, 5 Drawing Sheets

IMMERSION BARRIER FOR POUCH BATTERY CELL THERMAL RUNAWAY MITIGATION

INTRODUCTION

The present disclosure relates to an immersion barrier for mitigation of a thermal runaway event in a pouch battery cell module.

A battery module or array may include a plurality of battery cells in relatively close proximity to one another. Batteries may be broadly classified into primary and secondary batteries. Primary batteries, also referred to as disposable batteries, are intended to be used until depleted, after which they are simply replaced with new batteries. Secondary batteries, more commonly referred to as rechargeable batteries, employ specific chemistries permitting such batteries to be repeatedly recharged and reused, therefore offering economic, environmental and ease-of-use benefits compared to disposable batteries. Batteries may, for example, be configured as cylindrical, coin, or pouch cells.

Rechargeable batteries may be used to power such diverse items as toys, consumer electronics, and motor vehicles. Particular chemistries of rechargeable batteries, such as lithium-ion cells, as well as external factors, may cause internal reaction rates generating significant amounts of thermal energy. Such chemical reactions may cause more heat to be generated by the batteries than is effectively withdrawn. Exposure of a battery cell to elevated temperatures over prolonged periods may cause the cell to experience a thermal runaway event. Accordingly, a thermal runaway event starting within an individual cell may lead to the heat spreading to adjacent cells in the module and cause the thermal runaway event to affect the entire battery array.

SUMMARY

A battery module includes a first pouch battery cell and a neighboring second pouch battery cell. The battery module also includes a dielectric fluid in direct contact with and in circulation over and around each of the first pouch battery cell and the second pouch battery cell. The battery module additionally includes an immersion barrier positioned between the first pouch battery cell and the second pouch battery cell and defining an opening configured to control passage of the dielectric fluid between the first pouch battery cell and the second pouch battery cell. The immersion barrier thereby facilitates localization of a thermal runaway event in the first pouch battery cell by minimizing transfer of high temperature gases between the first pouch battery cell and the second pouch battery cell via the dielectric fluid and controls propagation of the thermal runaway event in the battery module. The battery module further includes a battery module enclosure surrounded by an external environment and configured to house and retain each of the first pouch battery cell, the second pouch battery cell, the dielectric fluid, and the immersion barrier.

The battery module enclosure may include a plurality of lateral walls, a floor section, and a cover section. In such an embodiment, the immersion barrier may extend to and directly contact each of the plurality of lateral walls, the floor section, and the cover section, such that the passage of the dielectric fluid between the first and second pouch battery cells is controlled solely via the opening.

The battery module may also include an aerogel layer arranged parallel to the immersion barrier.

The battery module may additionally include a compression foam element arranged parallel to the immersion barrier.

The battery module may also include a deflector extending over and configured to selectively shield one of the first and second pouch battery cells from battery cell debris coming from the other of the first and second pouch battery cells. The deflector may also pivot under pressure from and permit escape of the high temperature gases from the shielded pouch battery cell.

The deflector may include a first section arranged parallel to the immersion barrier and a second section arranged at an angle between 90 and 135 degrees relative to the first section.

The deflector may be incorporated into the immersion barrier, such that the deflector is arranged at an angle between 90 and 135 degrees relative to the immersion barrier.

A battery pack employing a plurality of such battery modules and a motor vehicle having a power-source and the battery pack configured to supply electric energy to the power-source are also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Those having ordinary skill in the art will recognize that terms such as "above," "below," "upward," "downward,"

"top," "bottom,", "left", "right", etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of a number of hardware, software, and/or firmware components configured to perform the specified functions.

Figure 1:
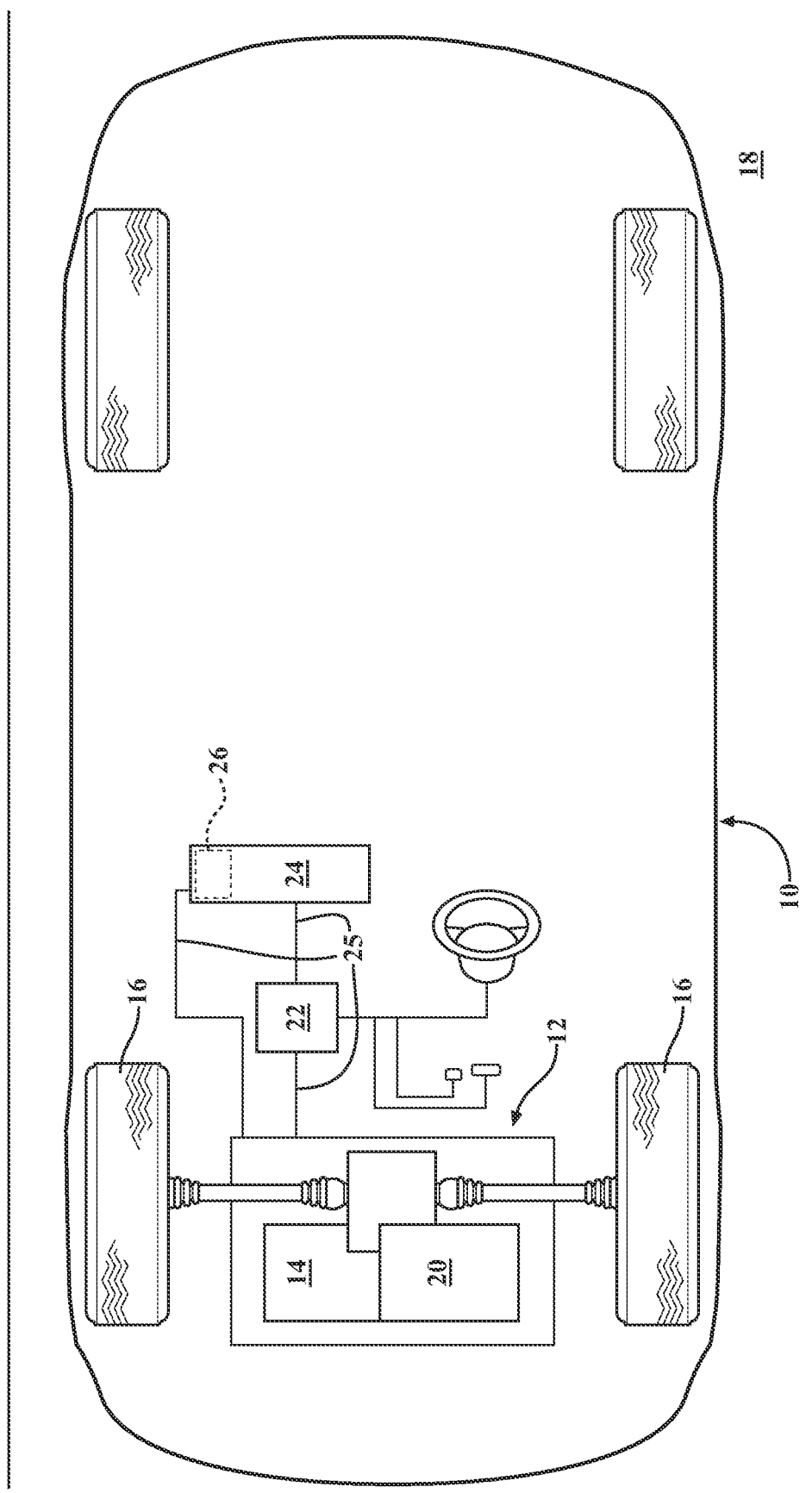
FIG. 1 is a schematic top view of an embodiment of a motor vehicle employing multiple power-sources and a battery pack having pouch battery cells arranged in module(s) configured to generate and store electrical energy.

Referring to FIG. 1, a motor vehicle 10 having a powertrain 12 is depicted. The vehicle 10 may include, but not be limited to, a commercial vehicle, industrial vehicle, passenger vehicle, aircraft, watercraft, train or the like. It is also contemplated that the vehicle 10 may be a mobile platform, such as an airplane, all-terrain vehicle (ATV), boat, personal movement apparatus, robot and the like to accomplish the purposes of this disclosure. The powertrain 12 includes a power-source 14 configured to generate a power-source torque T (shown in FIG. 1) for propulsion of the vehicle 10 via driven wheels 16 relative to a road surface 18. The power-source 14 is depicted as an electric motor-generator.

As shown in FIG. 1, the powertrain 12 may also include an additional power-source 20, such as an internal combustion engine. The power-sources 14 and 20 may act in concert to power the vehicle 10. The vehicle 10 additionally includes an electronic controller 22 and a battery pack 24 configured to generate and store electrical energy through heat-producing electro-chemical reactions for supplying the electrical energy to the power-sources 14 and 20. The electronic controller 22 may be a central processing unit (CPU) that regulates various functions of the vehicle 10, or as a powertrain control module (PCM) configured to control the powertrain 12 to generate a predetermined amount of power-source torque T. The battery pack 24 may be connected to the power-sources 14 and 20, the electronic controller 22, as well as other vehicle systems via a high-voltage BUS 25. Although the battery pack 24 is described herein primarily with respect to a vehicle environment, nothing precludes the subject battery pack from being employed to power other, non-automotive systems.

Figure 2:
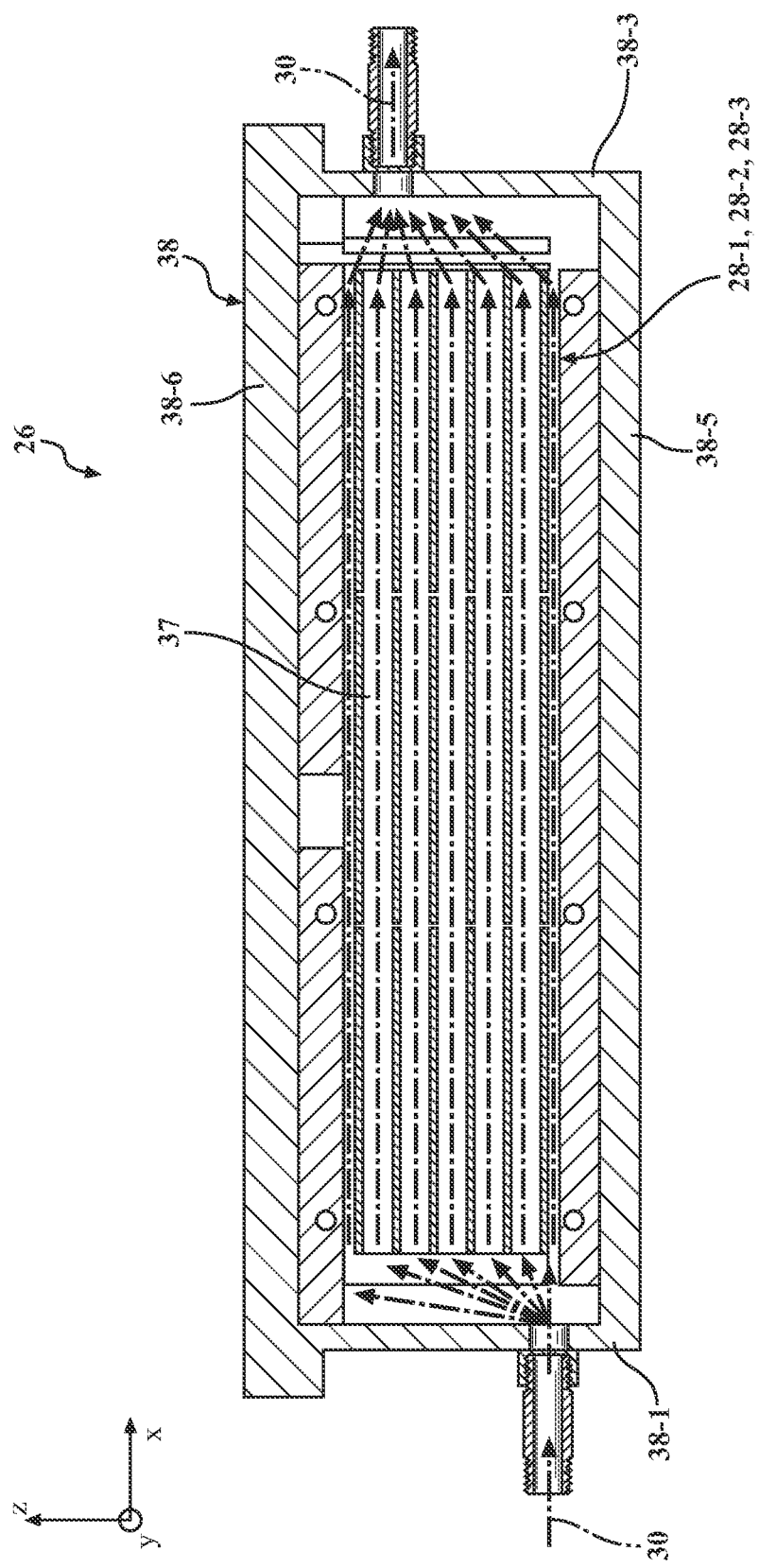
FIG. 2 is a schematic sectional side view of the battery module shown in FIG. 1 having a battery module enclosure.
Figure 3:
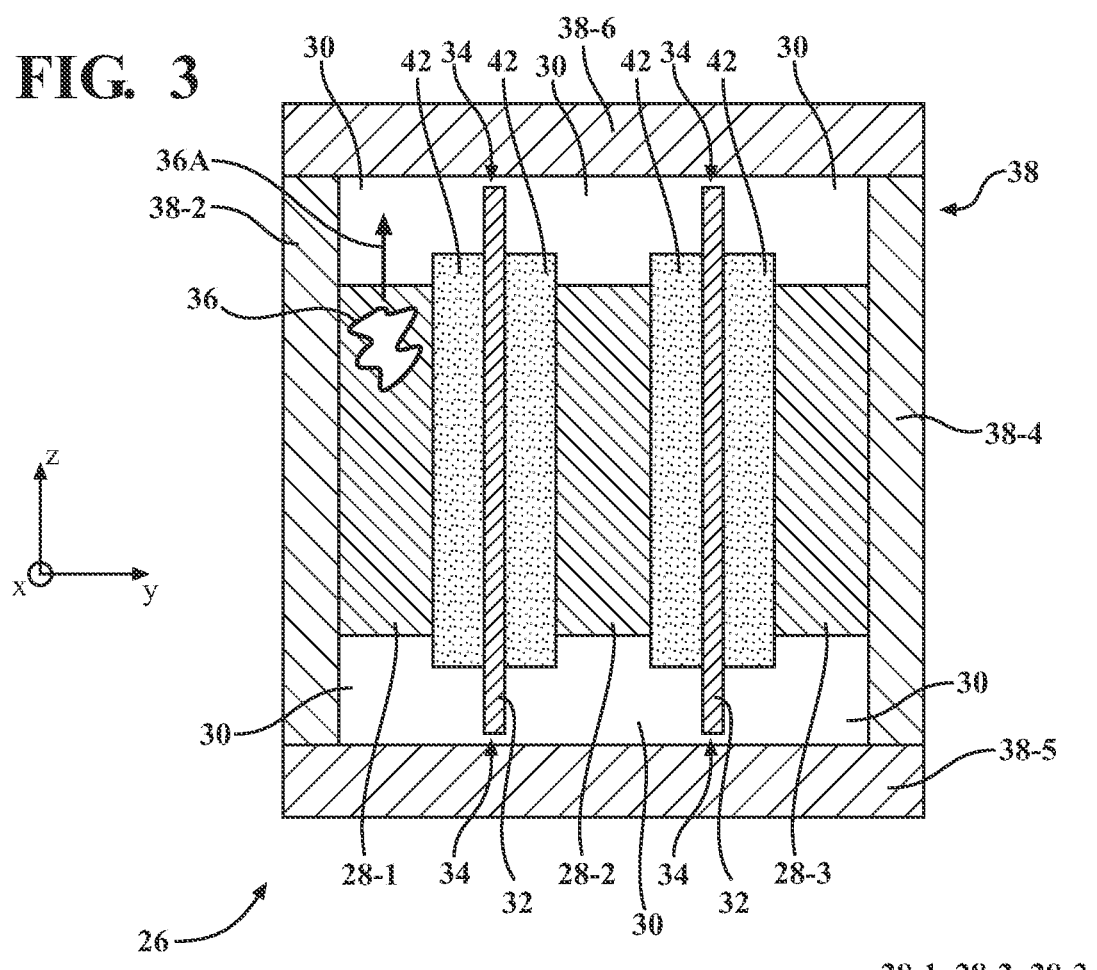
FIG. 3 is a schematic sectional front view of the battery module shown in FIG. 1, depicting individual pouch battery cells arranged side by side and immersion barriers arranged between neighboring pouch battery cells, according to the disclosure.
Figure 4:
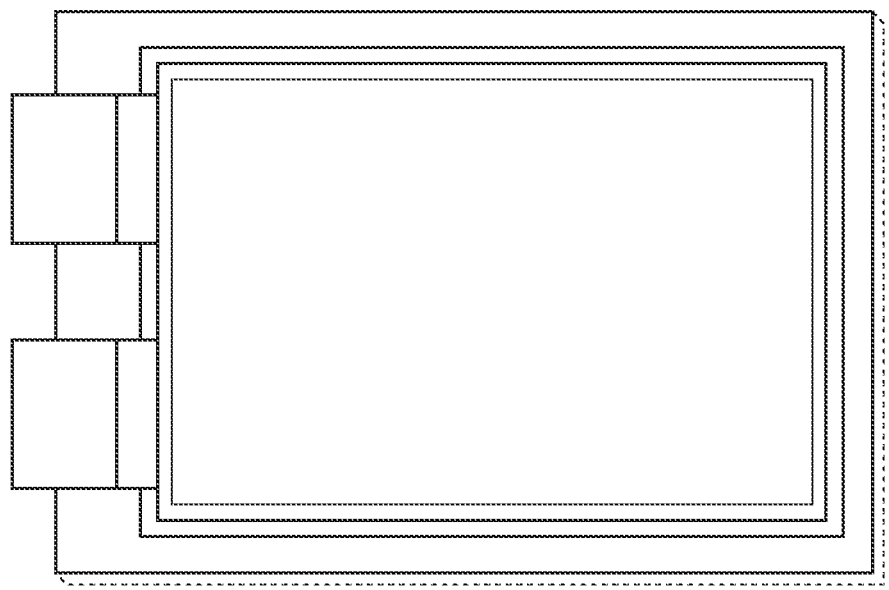
FIG. 4 is a schematic top view of a typical pouch battery cell.

As shown in FIG. 1, the battery pack 24 may include one or more sections, such as battery arrays or modules 26. As shown in FIGS. 2 and 3, the battery module 26 includes a plurality of pouch battery cells, such as a first pouch battery cell 28-1, a neighboring, directly adjacent, second pouch battery cell 28-2, and a third pouch battery cell 28-3 neighboring the second pouch cell, each battery cell shown extending generally upward, i.e., in the Z direction, as seen in FIGS. 2 and 3. Although one module 26 and three pouch battery cells 28-1, 28-2, 28-3 are shown, nothing precludes the battery pack 24 from having a greater number of such modules and battery cells. A typical pouch battery cell, such as the cells 28-1, 28-2, 28-3 is illustrated in FIG. 4. The battery module 26 also includes a dielectric fluid 30 in direct contact with, substantially surrounding, and in circulation over and around each of the first pouch battery cell 28-1, second pouch battery cell 28-2, and third pouch battery cell 28-3. In other words, the pouch battery cells 28-1, 28-2, 28-3 are fully immersed in the dielectric fluid 30. The dielectric fluid 30 may be circulated via a pressure source, such as an external fluid pump (not shown), to remove thermal energy from the first, second, and third pouch battery cells 28-1, 28-2, 28-3 while the battery module 26 generates/stores electrical energy.

The battery module 26 additionally includes immersion barriers 32 operating as insulating members. As shown, one immersion barrier 32 is positioned between the first pouch battery cell 28-1 and the second pouch battery cell 28-2, while another immersion barrier 32 is positioned between the second pouch battery cell 28-2 and the third pouch battery cell 28-3. The immersion barrier 32 is constructed from metal, or another material capable of withstanding up to 1000 degrees Celsius. Specifically, the immersion barrier may be a steel plate having a thickness in a 0.2-0.4 mm range, and may specifically have a 0.3 mm thickness. The immersion barrier 32 is specifically configured to limit the amount of direct thermal energy transfer between the neighboring battery cells 28-1, 28-2, 28-3 during battery module 26 operation. However, the dielectric fluid 30 circulating throughout the battery module 26 unimpeded will still transfer thermal energy between the neighboring battery cells. The immersion barrier 32 defines one or more openings 34 configured to control passage and communication of the dielectric fluid between the first pouch battery cell 28-1, the second pouch battery cell 28-2, and the third pouch battery cell 28-3. The sizing of the opening(s) 34 is intended to balance the conflicting concerns of sufficient coolant circulation and thermal energy propagation between the neighboring battery cells 28-1, 28-2, 28-3

The battery module 26 also includes a battery module enclosure 38 surrounded by an environment external to the battery module enclosure or ambient environment 40. The battery module enclosure 38 is configured to house and retain each of the first, second, and third pouch battery cells 28-1, 28-2, and 28-3, the dielectric fluid 30, and the immersion barrier 32. As shown in FIG. 3, a battery module 26 may have more than a single pouch battery cell, such as two or more of the cells 28-1, 28-2, 28-3 between two closest immersion barriers 32. In such an embodiment, the battery module 26 may also include spacers 37 extending along and between adjacent pouch battery cells. The spacers 37 maintain the adjacent battery pouch cells apart and thereby permit the dielectric fluid 30 to flow past the subject pouch cells and remove thermal energy therefrom.

Generally, during normal operation of the battery module 26, the dielectric fluid 30 is effective in absorbing thermal energy released by the first, second, and third pouch battery cells 28-1, 28-2, and 28-3 and facilitating transfer of the thermal energy out of the battery module. However, during extreme conditions, such as during a thermal runaway event (identified via numeral 36 in FIG. 3), the amount of thermal energy released by the pouch cell undergoing the event will typically be absorbed by the dielectric fluid 30 and transferred between the neighboring cells 28-1, 28-2, 28-3. Such transfer of the energy between the cells in the battery module 26 may eventually lead to propagation of thermal energy throughout the battery module, leading to a thermal runaway. Accordingly, the term "thermal runaway event" generally refers to an uncontrolled increase in temperature in a battery module.

During a thermal runaway event, the generation of heat within a battery module or a battery cell exceeds the module's ability to dissipate heat, thus leading to a further increase in temperature. A thermal runaway event may be triggered by various conditions, including a short circuit within the cell, improper cell use, physical abuse, manufacturing defects, or exposure of the cell to extreme external temperatures. For example, during the thermal runaway event 36 in the first pouch battery cell 28-1, each opening 34 of the immersion barrier 32 operates like an orifice by metering a predetermined amount of the dielectric fluid 30 between the neighboring pouch battery cells 28-1 and 28-2. The opening(s) 34 are specifically configured to facilitate localization of the thermal runaway event 36 in the first pouch battery cell 28-1 by minimizing transfer of high temperature gases 36A between the first pouch battery cell 28-1 and the second pouch battery cell 28-2 via the dielectric fluid 30. Accordingly, the opening(s) 34 control the rate of propagation of the thermal runaway event in the battery module 26.

With continued reference to FIGS. 2-3, the battery module enclosure 38 includes a plurality of lateral walls 38-1, 38-2, 38-3, 38-4, and a floor section 38-5 attached and sealed to the lateral walls. The battery module enclosure 38 additionally includes a cover section 38-6 generally positioned above the first, second, and third battery cells 28-1, 28-2, and 28-3 and attached to the lateral walls 38-1, 38-2, 38-3, and 38-4. The immersion barrier 32 extends to and directly contacts each of the plurality of lateral walls, 38-1, 38-2, 38-3, 38-4, the floor section 38-5, and the cover section 38-6, such that the passage of the dielectric fluid 30 between the first, second, and third pouch battery cells 28-1, 28-2, and 28-3 is controlled solely via and through the respective openings 34. The openings 34 may be defined by each of the immersion barriers 32 near the lateral walls 38-1, 38-2, 38-3, 38-4, and/or near the floor section 38-5 and the cover section 38-6 (shown in FIG. 3).

As shown in FIG. 3, the battery module 26 may also include aerogel layers 42 arranged parallel to the immersion barrier 32. Each aerogel layer may have a thickness in a 2-3 mm range, and may specifically have a 2.3 mm thickness. The aerogel layers 42 may be arranged on each side and in direct contact with a particular immersion barrier 32. For example, as shown, an aerogel layer 42 may be positioned on each side of a particular immersion barrier 32, such that the first pouch battery cell 28-1 and the third pouch battery cell 28-3 contacts one aerogel layer on one side and one of the housing lateral walls 38-1 or 38-3 on the other. The second pouch battery cells 28-2 may then be sandwiched between two aerogel layers 42. The amount of thermal energy being trapped in each compartment between individual immersion barriers 32 may be controlled by the sizing of the openings 34, and thus permit reduction in thickness of the aerogel layer(s) 42.

Figure 5:
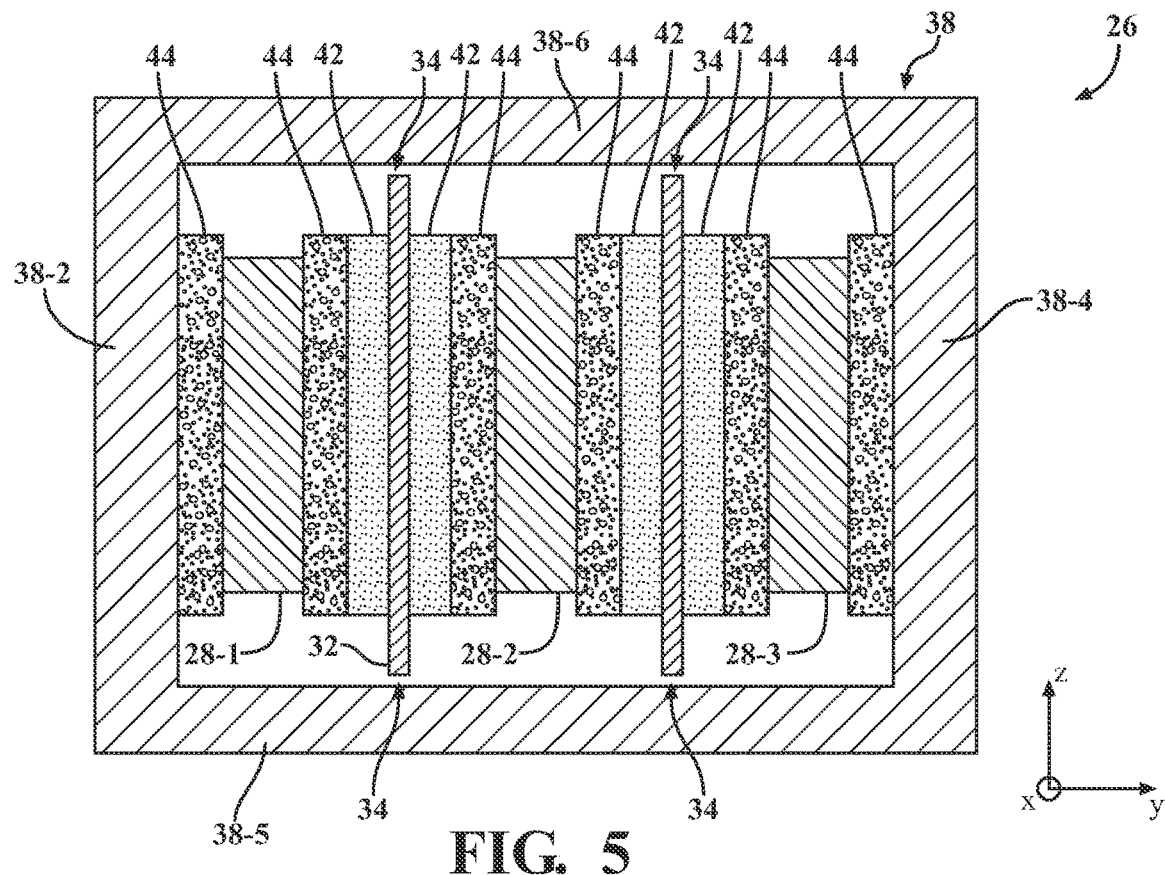
FIG. 5 is a schematic sectional front view of an embodiment of the battery module shown in FIG. 1, depicting a particular arrangement of aerogel layers and compression foam elements, according to the disclosure.

As shown in FIG. 5, the battery module 26 may additionally include compression foam elements 44 arranged parallel to the immersion barrier 32. The compression foam element 44 may be constructed from a high-temperature polymer foam with a stiffening substructure. Each compression foam element 44 is specifically configured to limit the amount of thermal energy transfer between the neighboring pouch battery cells, such as the cells 28-1, 28-2, and 28-3 during battery module 26 operation. Each compression foam elements 44 is further configured to maintain consistent and uniform contact with the respective first pouch battery cell 28-1, second pouch battery cell 28-2, or third pouch battery cell 28-3 during alternate expansion of the subject cells when charging and contraction of the cells when discharging.

Figure 6:
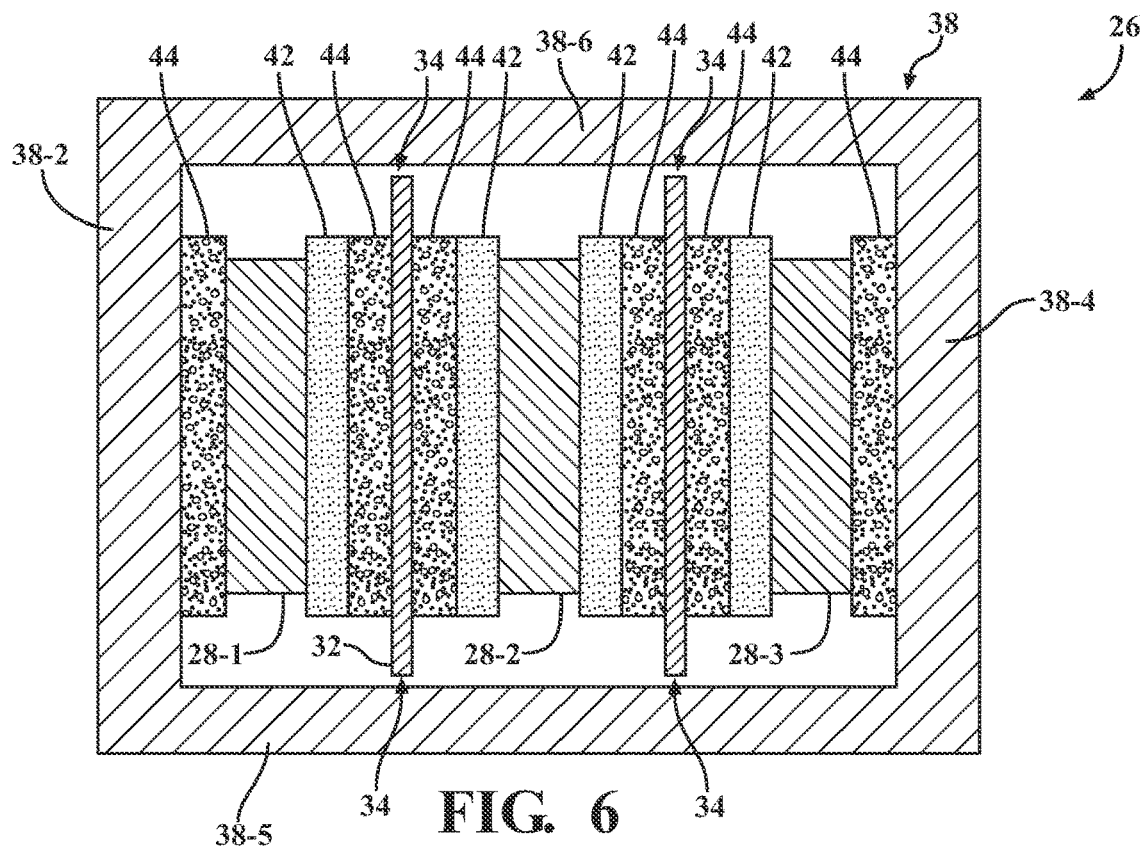
FIG. 6 is a schematic sectional front view of an embodiment of the battery module shown in FIG. 1, depicting another arrangement of aerogel layers and compression foam elements, according to the disclosure.

Each of the first, second, and third pouch battery cells 28-1, 28-2, and 28-3 may be sandwiched between two compression foam elements 44, such that each of the compression foam elements 44 is in direct contact with the nearest pouch battery cell 28-1, 28-2, or 28-3 (shown in FIG. 5). Alternatively, each individual compression foam elements 44 may be positioned between one respective aerogel layer 42 and one of the first, second, or third pouch battery cell 28-1, 28-2, 28-3, and another compression foam element 44 may be positioned between one of the side walls 38-2 or 38-4 and the nearest pouch battery cell 28-1 or 28-3 (shown in FIG. 6). In the embodiment of the battery module 26 having both the compression foam elements 44 and the aerogel layers 42, each aerogel layer 42 may be arranged between a corresponding immersion barrier 32 and a particular compression foam element 44.

For example, in the event the first battery cell 28-1 experiences the thermal runaway 36 (shown in FIG. 3), the excess gases generated by such an event would give rise to highly elevated internal pressures having tendency to distort the structure of and rupture the subject first pouch cell. The rupture of the affected first pouch battery cell 28-1 would permit the gases to escape the pouch and carry with them various battery cell internals turned into hot debris 48. Such debris 48 may be ejected from the afflicted first pouch battery cell 28-1 in the Z direction, pass over or around the immersion barrier 32 to the neighboring second pouch battery cell 28-2. Emission of high temperature gases 36A and debris 48 would increase the likelihood of a thermal runaway in the battery module 26 from the first battery cell 28-1 to the second battery cell 28-2, thereby generating a chain reaction and affecting the entire battery module 26. Although either the first or the second pouch battery cell 28-1, 28-2 may generate high temperature gases 36A and debris 48 due to the thermal runaway event 36, the present disclosure specifically focuses on an exemplary case when the first pouch battery cell 28-1 undergoes the thermal runaway event.

Figure 7:
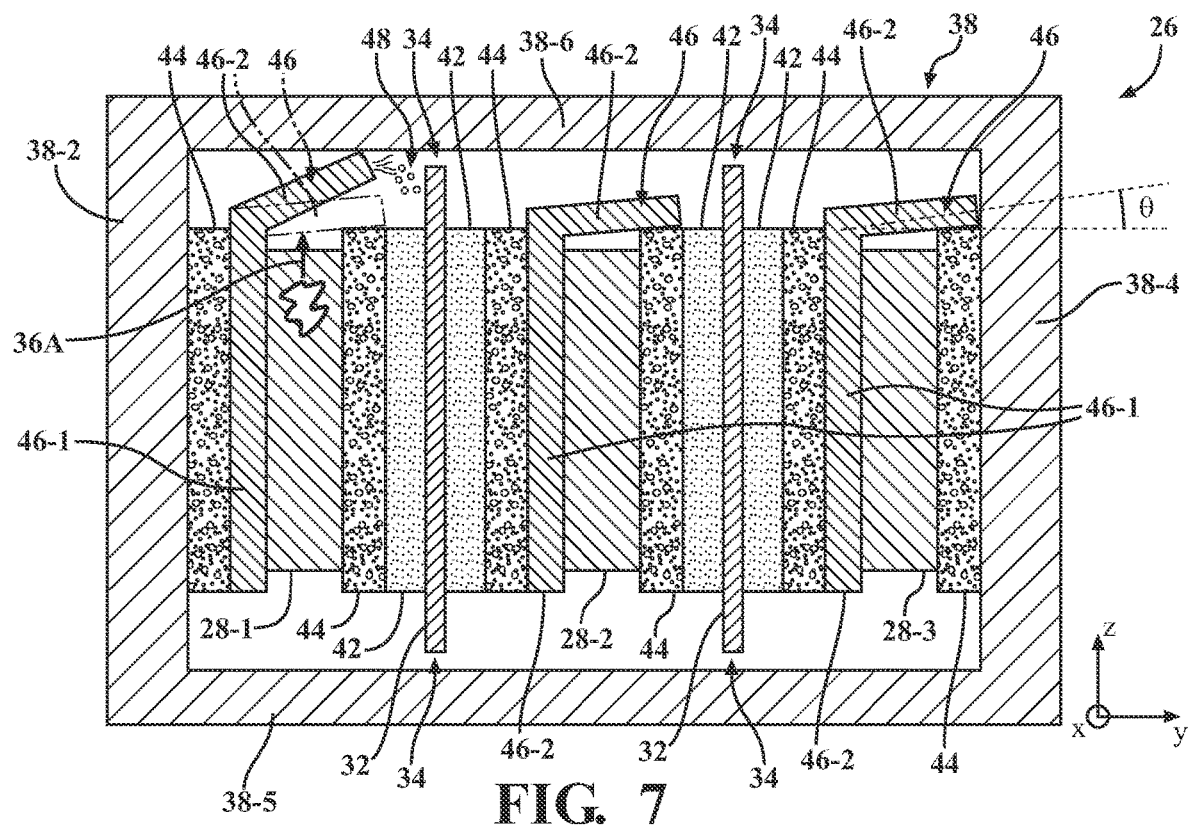
FIG. 7 is a schematic sectional front view of an embodiment of the battery module shown in FIG. 1, depicting deflectors arranged proximate immersion barriers and configured to shield individual pouch battery cells, according to the disclosure.

To protect each opening 34 from such emission of hot gases and debris by the neighboring cell, the battery module 26 may further include deflectors 46, as shown in FIG. 7. Each deflector 46 extends over and is configured to selectively shield one of the first, second, and third pouch battery cells 28-1, 28-2, 28-3 from battery cell debris 48. Specifically, the deflector 46 is arranged above the first battery pouch cell 28-2 to protect the subject pouch cell from debris coming from the other, neighboring first pouch battery cell 28-1. Each deflector 46 is also configured to pivot away from the shielded pouch battery cell 28-1, 28-2, or 28-3 under pressure from the subject cell's high temperature emitted gases 36A and permit escape of the gases and the debris 48 from the shielded pouch battery cell. The pivoting action of the deflector 46 is enabled by the deflector being anchored at point 46A and overhanging the shielded pouch battery cell.

Figure 8:
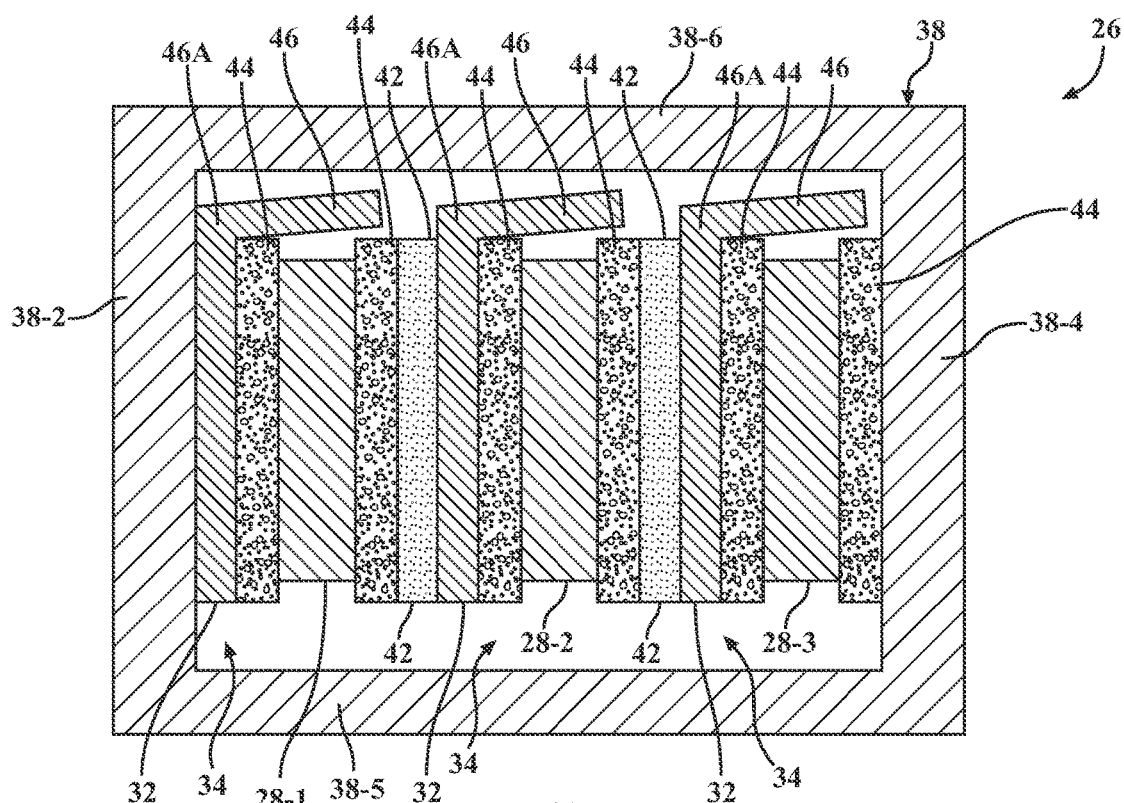
FIG. 8 is a schematic sectional front view of an embodiment of the battery module shown in FIG. 1, depicting an arrangement of deflectors incorporated into respective immersion barriers and configured to shield individual pouch battery cells, according to the disclosure.

With continued reference to FIG. 7, each deflector 46 may include a first section 46-1 arranged parallel to the immersion barrier 32 and a second section 46-2. As shown, the second section 46-2 may be arranged at an angle θ, which may be in a range of 90 to 135 degrees relative to the first section 46-1. Each deflector 46 may be a separate component arranged proximate an individual immersion barrier 32 (shown in FIG. 7). Alternatively, each deflector 46 may be incorporated into an individual immersion barrier 32 (shown in FIG. 8). In other words, the deflector 46 and the corresponding immersion barrier 32 of FIG. 8 may be constructed as a single, unitary component. The deflector 46 may be arranged at the angle θ in the range of 90 to 135 degrees relative to the immersion barrier 32, itself positioned parallel to the pouch battery cells 28-1, 28-2, 28-3. The deflectors 46 are thereby configured to minimize transfer of the high temperature gases and debris from one of the first, second, and third battery cell 28-1, 28-2, 28-3 to one or more of the other neighboring cells and control propagation of a thermal runaway event 36 in the battery module 26.

Overall, during operation of the battery module 26, the aerogel layers 42 and/or the compression foam elements 44 mitigate propagation of a thermal runaway directly between individual battery cells and facilitate transfer of the energy to the dielectric fluid 30. Additionally, the immersion barrier 32 with the openings 34 absorb excess thermal energy from the particular pouch battery cell 28-1, 28-2, or 28-3 undergoing a thermal event, while regulating or metering the amount of subject thermal energy being transferred to the neighboring pouch cell(s) via the dielectric fluid 30. Thus, construction of the immersion barrier 32 facilitates emission of the excess thermal energy generated by a thermal runaway event in a particular battery cell from the battery module 26 to the ambient environment 40 via the circulating dielectric fluid 30 with minimized effect on the neighboring cell(s). Furthermore, the deflectors 46 will redirect high temperature gases 36A and debris 48 emitted by the afflicted pouch cell away from its neighboring cell(s), thus minimizing the possibility of the thermal event affecting other cells in the battery module 26. Hence, construction of the disclosed battery module 26 is particularly effective in mitigating propagation of a thermal runaway between the constituent pouch battery cells, without requiring additional external hardware or controls.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A battery module comprising:
   a first pouch battery cell and a neighboring second pouch battery cell;
   a dielectric fluid in direct contact with and in circulation over and around each of the first pouch battery cell and the second pouch battery cell;
   an immersion barrier positioned between the first pouch battery cell and the second pouch battery cell and defining an opening configured to control passage of the dielectric fluid between the first pouch battery cell and the second pouch battery cell to thereby facilitate localization of a thermal runaway event in the first pouch battery cell by blocking direct transfer of high temperature gases between opposing sides of the first pouch battery cell and the second pouch battery cell via the dielectric fluid and control propagation of the thermal runaway event in the battery module; and
   a battery module enclosure surrounded by an external environment and configured to house and retain each of the first pouch battery cell, the second pouch battery cell, the dielectric fluid, and the immersion barrier;
   wherein:
      the battery module enclosure includes a plurality of lateral walls, a floor section, and a cover section, and wherein the immersion barrier extends to and directly contacts each of the plurality of lateral walls, the floor section, and the cover section, wherein each opening is positioned adjacent to one of the plurality of lateral walls, the floor section, and/or the cover section; and
      the passage of the dielectric fluid between the first and second pouch battery cells is allowed solely via the opening.

2. The battery module of claim 1, further comprising an aerogel layer arranged parallel to the immersion barrier.

3. The battery module of claim 1, further comprising a compression foam element arranged parallel to the immersion barrier.

4. The battery module of claim 1, further comprising a deflector extending over and configured to selectively shield one of the first and second pouch battery cells from battery cell debris coming from the other of the first and second pouch battery cells, and pivot under pressure from and permit escape of the high temperature gases from the shielded pouch battery cell.

5. The battery module of claim 4, wherein the deflector includes a first section arranged parallel to the immersion barrier and a second section arranged at an angle between 90 and 135 degrees relative to the first section.

6. The battery module of claim 4, wherein the deflector is incorporated into the immersion barrier, such that the deflector is arranged at an angle between 90 and 135 degrees relative to the immersion barrier.

7. A battery pack comprising:
   a plurality of battery modules, each battery module having:
      a first pouch battery cell and a neighboring second pouch battery cell;
      a dielectric fluid in direct contact with and in circulation over and around each of the first pouch battery cell and the second pouch battery cell;
      an immersion barrier positioned between the first pouch battery cell and the second pouch battery cell and defining an opening configured to control passage of the dielectric fluid between the first pouch battery cell and the second pouch battery cell to thereby facilitate localization of a thermal runaway event in the first pouch battery cell by blocking direct transfer of high temperature gases between opposing sides of the first pouch battery cell and the second pouch battery cell via the dielectric fluid and control propagation of the thermal runaway event in the battery module; and
      a battery module enclosure surrounded by an external environment and configured to house and retain each of the first pouch battery cell, the second pouch battery cell, the dielectric fluid, and the immersion barrier;
      wherein:
         the battery module enclosure includes a plurality of lateral walls, a floor section, and a cover section, and wherein the immersion barrier extends to and directly contacts each of the plurality of lateral walls, the floor section, and the cover section, wherein each opening is positioned adjacent to one of the plurality of lateral walls, the floor section, and/or the cover section; and
         the passage of the dielectric fluid between the first and second pouch battery cells is allowed solely via the opening.

8. The battery pack of claim 7, wherein each battery module additionally includes an aerogel layer arranged parallel to the immersion barrier.

9. The battery pack of claim 7, wherein each battery module additionally includes a compression foam element arranged parallel to the immersion barrier.

10. The battery pack of claim 7, wherein each battery module additionally includes a deflector extending over and configured to selectively shield one of the first and second pouch battery cells from battery cell debris coming from the other of the first and second pouch battery cells, and pivot under pressure from and permit escape of the high temperature gases from the shielded pouch battery cell.

11. The battery pack of claim 10, wherein the deflector includes a first section arranged parallel to the immersion barrier and a second section arranged at an angle between 90 and 135 degrees relative to the first section.

12. The battery pack of claim 10, wherein the deflector is incorporated into the immersion barrier, such that the deflector is arranged at an angle between 90 and 135 degrees relative to the immersion barrier.

13. A motor vehicle comprising:
- a power-source configured to generate power-source torque; and
- a battery pack configured to supply electrical energy to the power-source, the battery pack including a plurality of battery modules, each battery module having:
- a first pouch battery cell and a neighboring second pouch battery cell;
- a dielectric fluid in direct contact with and in circulation over and around each of the first pouch battery cell and the second pouch battery cell;
- an immersion barrier positioned between the first pouch battery cell and the second pouch battery cell and defining an opening configured to control passage of the dielectric fluid between the first pouch battery cell and the second pouch battery cell to thereby facilitate localization of a thermal runaway event in the first pouch battery cell by blocking direct transfer of high temperature gases between opposing sides of the first pouch battery cell and the second pouch battery cell via the dielectric fluid and control propagation of the thermal runaway event in the battery module; and
- a battery module enclosure surrounded by an external environment and configured to house and retain each of the first pouch battery cell, the second pouch battery cell, the dielectric fluid, and the immersion barrier;

wherein:
- the battery module enclosure includes a plurality of lateral walls, a floor section, and a cover section, and wherein the immersion barrier extends to and directly contacts each of the plurality of lateral walls, the floor section, and the cover section, wherein each opening is positioned adjacent to one of the plurality of lateral walls, the floor section, and/or the cover section; and
- the passage of the dielectric fluid between the first and second pouch battery cells is allowed solely via the opening.

14. The motor vehicle of claim 13, wherein each battery module additionally includes at least one of an aerogel layer arranged parallel to the immersion barrier and a compression foam element arranged parallel to the immersion barrier.

15. The motor vehicle of claim 13, wherein each battery module additionally includes a deflector extending over and configured to selectively shield one of the first and second pouch battery cells from battery cell debris coming from the other of the first and second pouch battery cells, and pivot under pressure from and permit escape of the high temperature gases from the shielded pouch battery cell.

16. The motor vehicle of claim 15, wherein the deflector includes a first section arranged parallel to the immersion barrier and a second section arranged at an angle between 90 and 135 degrees relative to the first section.

17. The motor vehicle of claim 15, wherein the deflector is incorporated into the immersion barrier, such that the deflector is arranged at an angle between 90 and 135 degrees relative to the immersion barrier.

* * * * *